United States Patent
Dean et al.

(10) Patent No.: US 6,173,173 B1
(45) Date of Patent: Jan. 9, 2001

(54) INVALID MOBILE TELEPHONE CALL TERMINATING SYSTEM AND METHOD

(75) Inventors: Lauran F. Dean, Lisle; David A. Jones; Michael Marcovici, both of Wheaton, all of IL (US)

(73) Assignee: Lucent Technologies, Inc., Murray Hill, NJ (US)

(*) Notice: Under 35 U.S.C. 154(b), the term of this patent shall be extended for 0 days.

(21) Appl. No.: 09/108,794

(22) Filed: Jul. 2, 1998

(51) Int. Cl.[7] .............................. H04M 1/68; H04M 1/66; H04M 1/00; H04B 1/38
(52) U.S. Cl. ...................... 455/410; 455/410; 455/411; 455/560
(58) Field of Search ........................ 455/410, 411, 455/422–424, 445, 560, 561

(56) References Cited

U.S. PATENT DOCUMENTS 5,826,186 * 10/1998 Mitchell et al. .................. 455/410
5,854,975 * 12/1998 Fougnies et al. .................. 455/408

* cited by examiner

Primary Examiner—Daniel S. Hunter
Assistant Examiner—Meless Zewdu
(74) Attorney, Agent, or Firm—Carmen B. Patti; Wildman, Harrold, Allen & Dixon

(57) ABSTRACT

An invalid mobile telephone call made within the service area of a vendor monitored by a vendor computer is detected by RF fingerprinting or the like results in transmission of a kill-call command over a TCP/IP network to a kill-call server that is interfaced with a mobile service center through a data link interface. The kill-call server determines whether the kill-call command is valid and, if so, then it transmits a message tear down request over the data link interface to an executive cellular processor which, if the kill-call capability is active, conveys a call termination message to the associated administrative call processing database node to effect the call termination.

23 Claims, 5 Drawing Sheets

INVALID MOBILE TELEPHONE CALL TERMINATING SYSTEM AND METHOD

BACKGROUND OF THE INVENTION

This invention generally relates to mobile telecommunications and more particularly to a method and system for terminating invalid mobile telephones.

Fraudulent use of the network of a mobile service provider, or vendor, is a major concern with losses for 1995 estimated at $650 million. Vendors in the major metropolitan areas are especially susceptible to losses caused by "clones" which are reported to account for 90% of the total revenue losses due to fraud. The best protection against cloning is authentication, but unfortunately, there are close to forty million phones in the market that are not authentication capable. In addition to authentication, a number of fraud prevention methods have been developed to deal with the cloning problem. These other techniques include techniques known as PIN encoding, roamer verification reinstatement, call profiling and radio frequency, or RF, fingerprinting.

Some of those techniques cannot directly interface with the MSC to terminate a "suspected" call. For example, even if an RF fingerprint detection system detects a clone, the call is still established. There is no capability to block a call origination.

The present inventors have determined that in order to effectively use external fraud management applications, a reliable method of tearing down a suspected call is required. This need is believed to be especially critical for applications using the RF fingerprinting technique in which generally the RF fingerprinting equipment is installed at a cell site and passively monitors call attempts. The unique RF pattern, or fingerprint, associated with each analog mobile telephone is stored for future reference. On any new call origination, the RF fingerprint is compared with the one stored, and if there is no match, the RF application detects a fraudulent call.

The present inventors have also determined that there is also a need for reliable method and apparatus for tearing down a so-called "pre-paid call" by a subscriber that is allowed to make a limited amount of calls on a pre-paid basis. Once the pre-paid credit is exhausted during the course of a metered call, there is a need to tear down the currently active call in association with generation of an automatic message accounting, or AMA, record.

It has also been determined by the inventors that there is also a need to enable tear-down of an active call by manual intervention by an operator via a Technician Interface (TI) command.

SUMMARY OF THE INVENTION

In accordance with the present invention a method and system is provided that overcomes the inadequacies noted above and reliably provides invalid call termination.

Preferably, an invalid mobile telephone call being serviced by a mobile service center is terminated by performing the steps of determining at a mobile telephonic service vendor computer linked with the mobile service center that an invalid call originating in a local service area of the vendor is in process, generating from the vendor computer a kill-call command in response to determining that the invalid call is in process, responding to the kill-call command at a kill-call server linked with the mobile service center and the vendor computer to transmit a call tear-down request message to the mobile service center, and tearing down the invalid call at the mobile service center in response to the receipt of the call-tear down request message.

Preferably, the step of determining includes the step of monitoring calls with respect to matching associated radio frequency pattern of authorized mobile telephones to determine whether the calls are invalid.

Alternatively, in a non-fraud application, the step of determining includes the step of monitoring remaining credit for calling charges associated with metered calls to determine whether the metered calls are invalid.

In other applications, or in the same applications, the step of determining includes the step of indicating at the vendor computer that a call is an invalid call and the step of generating is performed manually in response to the indication.

The step of responding includes the steps of ascertaining whether the call that is subject of the tear-down request message is active, and transmitting the call tear-down request message only if the call is still active.

In such case the step of determining includes the steps of attempting to verify vendor authorization before transmitting a call tear-down request message to the mobile service center, and preempting the step of ascertaining and ignoring the kill-call command if authorization of the vendor associated with the kill-command is not verified.

Preferably, a report at the kill-call server related to results of the kill-call command is generated.

In the preferred embodiment of the system the kill-call command is transmitted from the vendor computer to the kill-call server through a transmission control protocol/internet protocol interface and the call tear-down request message is interface with the mobile call center through a data link interface.

In accordance with the invention, a system is provided for automatically performing the steps of the method described for terminating an invalid mobile telephone call being serviced by a mobile service center. The system of the invention preferably includes a vendor computer linked with the mobile service center and having a provision for determining that an invalid call originating in a local service area of the vendor is in process, a provision responsive to the invalid call for generating from the vendor computer a kill-call command, a kill-call server linked with the mobile service center and the vendor computer to transmit a call tear-down request message to the mobile service center in response to the kill-call command and a provision at the mobile service center for tearing down the invalid call in response to the receipt of the call-tear down request message.

BRIEF DESCRIPTION OF THE DRAWINGS

The foregoing advantageous features of the present invention will be described in detail and other advantageous features will be made apparent from the detailed description of an embodiment of the invention that is given with reference to the several figures of the drawing, in which.

DETAILED DESCRIPTION

The invalid call terminating method and system of the present invention, or enhanced kill call capability terminates potentially fraudulent calls in the mobile home market of the mobile telephone service subscriber. This capability enables service providers to tear down fraudulent calls by using either a third party client application or a technician interface (TI) command. Specialized hardware to achieve this capability is not required.

The enhanced kill call capability receives its stimulus for tearing down a call from either a network client connection or a TI command. The capability has four major components; a code needed to tear down a call, a new TI command, an OMP resident server process, and a TCP/IP client application for determining when an invalid call is to be terminated.

Figure 1:
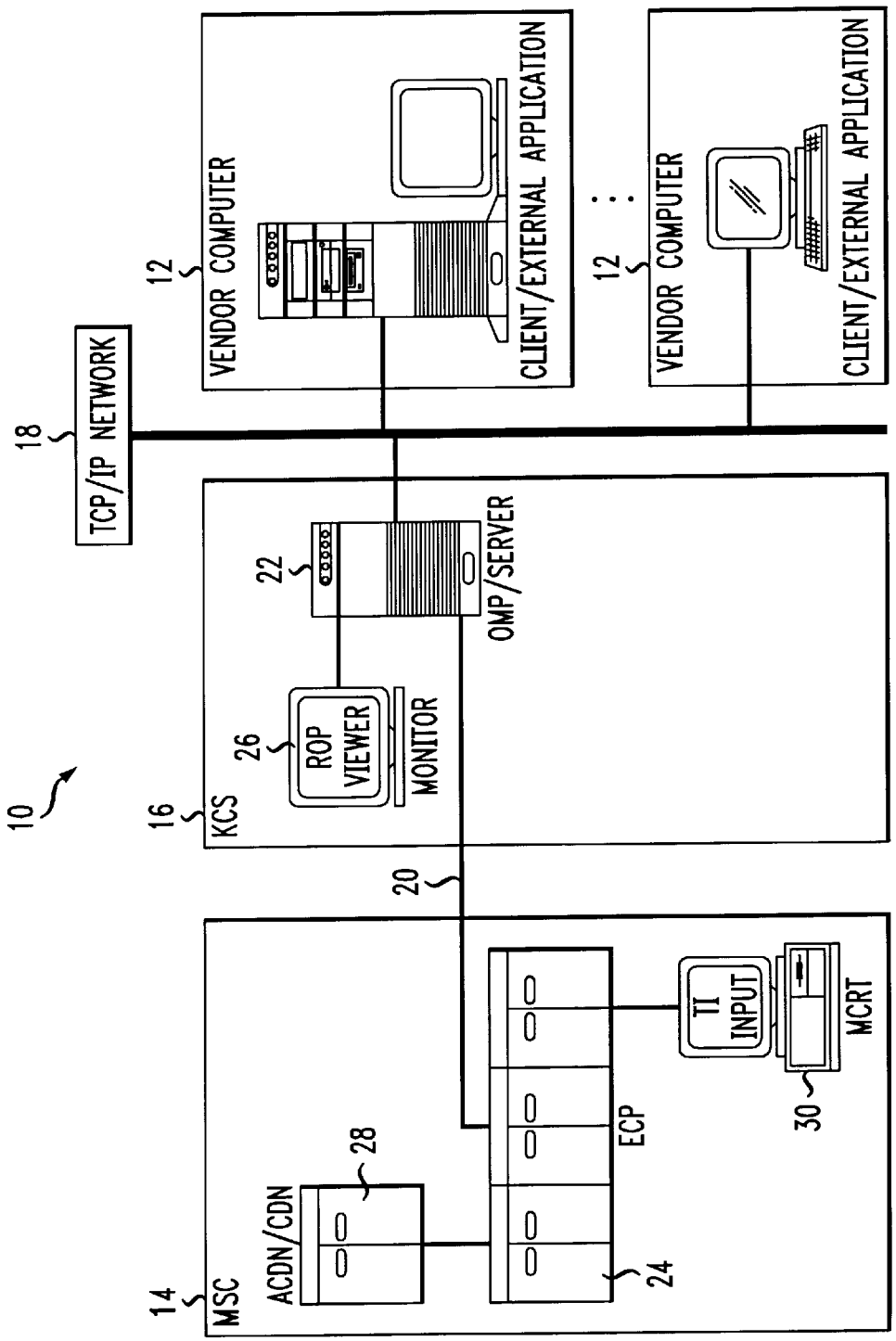
FIG. 1 is a functional block diagram of the preferred embodiment of the invalid call terminating system.

FIG. 1 illustrates this fundamental architecture of the preferred embodiment of the enhanced kill call capability system, or EKCC system, 10. A plurality of vendor computers 12 are linked with a mobile service center, or MSC, 14 through a kill-call server, or KCS, 16. The vendor computers 12 are linked to the kill-call server through a transmission control protocol/internet protocol, or TCP/IP, network 18 and the mobile service center 14 is linked to the kill-call server 14 through a digital communication interface, or DCI, link 20. The vendor computers 12 have means for detecting an invalid mobile call, preferably by monitoring RF fingerprints in the case of fraudulent calls by "clones" and by monitoring the remaining credit balance of metered, pre-paid calls. The details of how the invalid calls are detected does not form a part of the invention and are therefor not disclosed here.

The kill-call server 16 includes an operations and management platform, or OPM,/kill-call computer 22 connected with the vendor computers 12 via the TCP/IP network on the one hand and to an executive cellular processor, or executive cellular processor (ECP), 24 of the mobile service center 14 through the data link interface 20, on the other hand, to selectively send kill-call messages thereto in response to kill-call commands from the vendor computers 12. The kill-call server also includes a read only printer, or ROP, viewer/monitor 26 to view reports concerning the actions taken by the OMP/kill-call server 22.

The mobile service center includes an administrative call processing/data base node, or ACDN/CDN, 28 for performing the actual call processing and a mobile center RT, or MCRT, 30 for enabling technician interface, or TI, input to the ECP 24 from a technician to terminate an invalid call. The ECP 24 responds to the kill-call message by controlling the ACDN/CDN 28 to actually tear down the invalid call.

In accordance with the invention, when a TI request is made, the request is validated before taking any affirmative action. Once validation is complete, a tear down request message is formatted and sent to the ACDN 28.

Requests made from a TCP/IP network client, or vendor computer, 12 are initiated by a third party client application that conforms to the protocol specification of the invention defined below. The protocol specification defines a protocol for communication between a TCP/IP network client 12 and the OMP/kill-call server 22. An OMP server process waits for client TCP/IP connection requests. The client application connects to the server and requests that a call, that it has determined is fraudulent, be torn down. The OMP/server 22 performs verification that the client 12 has the authority to request the service and then forwards the request to the ACDN 28 through the ECP 24 for the actual tear down.

Once the ACDN 28 receives the tear down request, it will determine if the call is active. If the call is active, the ACDN 28 will forward the message to the appropriate CDN. Messages that do not require tearing down a call are sent to the ROP 26 by the ACDN 28 and are not forwarded to the CDN.

Once the CDN has completed its task, the results from the tear down request are sent back to the OMP/kill-call server 22 and, from there, forwarded to the client, or vendor computer 12.

The system is capable of tearing down a call made from a location outside of the service area of the mobile service center. A call tear down (KILLCALL) optional feature is used to kill a call in a visited system. In order to do so, however, the call tear down optional feature must be active at the visited system in order for the visited system to tear down the call.

If a call is killed using the call tear down optional feature and a fraudulent mobile print optional feature is ON, no fraudulent mobile print will be performed at the system. If a call is killed in a visited system using EKCC, the call tear down optional feature determines if a fraudulent mobile print is performed at the visited system.

A subscriber is unaffected by this feature unless a service provider has the optional EKCC feature of the invention active, and either a client application at the vendor computer 12 or a technician input command from the MCRT 30 initiates the tear down of a call for the identification of the mobile subscriber. Of course, a subscriber is affected if they are on the other end of a call that is determined to be fraudulent.

The vendor requires no new equipment in order to implement the EKCC features. Service providers in order to use the enhanced kill call feature must have the feature activated. No special hardware is required for this feature. Calls are torn down either through a technician input command or by the TCP/IP client application that conforms to the protocol specification described below. The details of the application for detecting invalid calls and interfacing a kill-call command with the server 22 does not form any part of this invention except as noted the application must conform to the EKCC protocol.

Advantageously, no changes need to be made to existing AMA records or structures in order to implement the EKCC system.

Preferably, there are different types of kill-call commands. If a call is killed using the EKCC command "Kill Call without AMA", an AMA Security Entry only will be created at the home system. If a call is killed using the EKCC command "Kill Call with AMA", a Billable AMA entry will be created at the home system. If a call is killed using the EKCC command "Kill Call Alert Only", this feature will not affect the AMA entry. If a call is killed in a visited system using EKCC, the AMA records currently generated by the Call Tear Down (KILLCALL) optional feature will be created at the visited system.

In accordance with the invention, an ECP short count (ECP SCNTS) is kept of the number of calls torn down by the Enhanced Kill Call Capability. This count is only incremented if the KillCall Result is Call Torn Down (success) or KillCall Requested (visited system). It is not incremented if the KillCall Result is DN Not Found, Originating System Not Valid, Call Cannot Be Killed, Password Not Valid, Request Printed Only, or Restricted Call (Not Killed). This count is not incremented for calls torn down by the Call Tear Down optional feature.

A new TI command is provided to tear down an active call. The format of the command is as follows:

EXC:KillCall;DNa;CMDb!

where a is the 10 digit mobile ID number of the call that is to be torn down b is a number from 1–3 for the following actions:

1 Kill Call without an AMA
2 Kill Call with an AMA
3 Alert Only

An ROP report will be generated for each request received from the external system or from the technician's input command, using the standard REPT format, as follows:

EXC:KILL CALL DIRECTIVE

The fields that will be displayed include:

| Field | Description |
| --- | --- |
| DN | Mobile ID |
| CMD | The command received from the external system |
| Date | Date the call is torn down |
| Time | Time the call is torn down |
| RSLT | The EKCC command result-the MSC response to the request |
| Originating System ID (OSID) | The requesting external system. If the command is initiated by TI the OSID = "TI" |
| Request Number | Request number sent by the external system. If the command is initiated by TI the RN = "0" |

Figure 2:
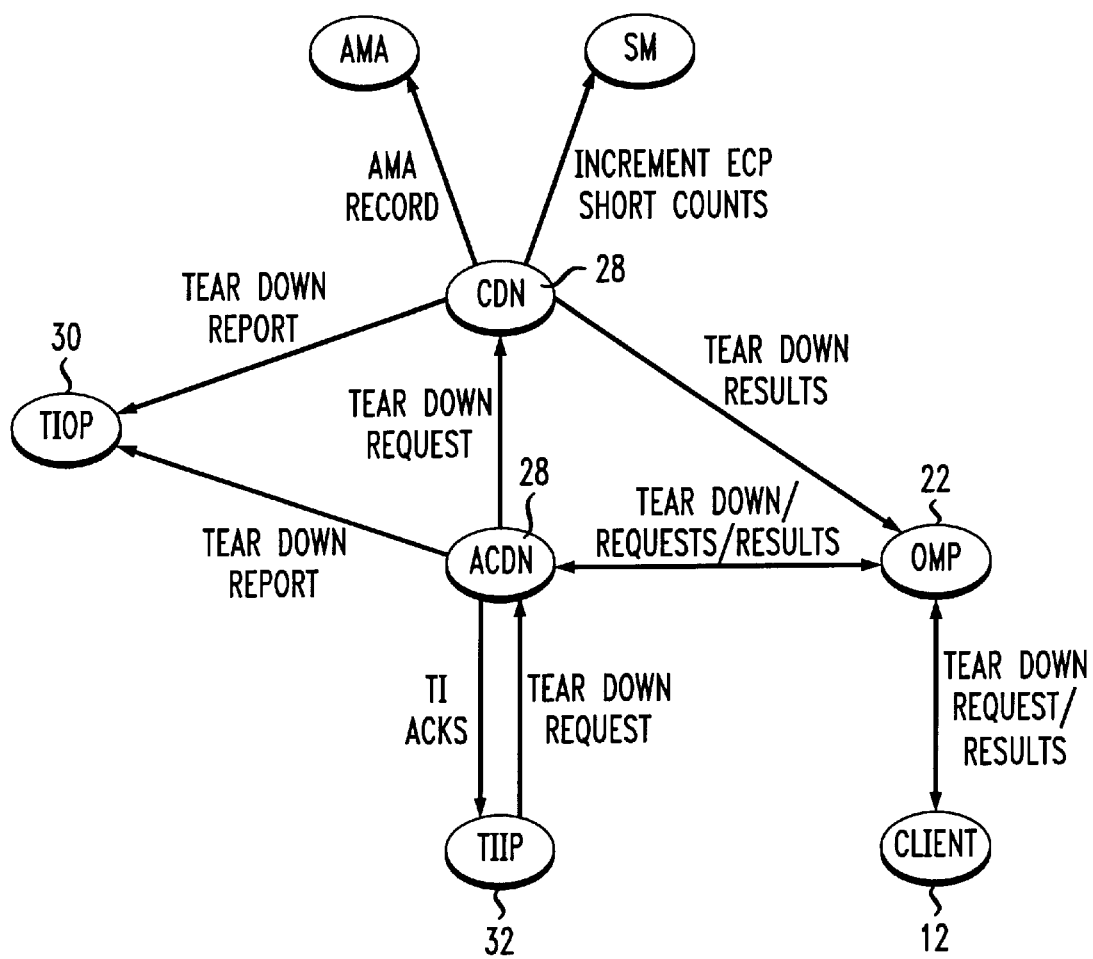
FIG. 2 is a diagram showing the functional relationships of the major components of the system of FIG. 1.

The EKCC includes the following components:

- TI-IP modifications for new EKCC TI command to tear down a call
- TI-OP modifications for reporting results of EKCC attempts
- SM modifications for tracking the number of calls killed by EKCC
- ACDN modifications to process EKCC requests from TI-IP and external clients
- CDN modifications to process EKCC requests from the ACDN
- modifications to prevent AMA from writing certain records
- a protocol specification for a client application
- an OMP server process to interface with the client via TCP/IP sockets, perform user/system validation, format a message to the ACDN with the information needed to tear down a call, receive the kill call results from the ACDN, and forward the appropriate result information to the client
- A tool to notify the server that the system database file has been modified FIG. 2 shows the relationship of the major components for the EKCC method of the present invention.

The TI-IP functionality 32 recognizes the EXC:KILL-CALL command. TI-IP 32 is responsible for parsing the command and validating the number and values of parameters in the TI-IP command. It is also responsible for doing a feature activation file, or FAF, check to make sure that the EKCC feature has been activated and for converting the directory number, or DN. If everything is acceptable, the IPO-IP 32 formats and sends the IPKILLCALL message to the CP-AC, or on the ACDN 28; otherwise, an error message is printed via a call to Ipperr.

The TI-OP functionality recognizes the message type of MGOPEKCC which results in the OPkillcall( ) function being called. OPkillcall( ) will then use the information contained in the OPKILLCALL message to format the EXK: KILL CALL DIRECTIVE message. The OP message is routed to direct this to ROP and/or files. Additionally, each CDN is preferably limited to sending ten of these messages in a given interval via appropriate overload control mechanisms.

The ECP SHORT COUNT (SMSCNTSSPARE1) is used to keep track of the number of calls killed by the EKCC feature. It will be pegged at the CDN using SMSYSPGINC( ) which increments the appropriate index of SMbufptr→sys.scnts[index] in CDN memory. SMcollect( ) at the ECP calls SMcdnpoll( ) on an hourly basis to poll each of the CDNs for their SM data. SMcdnpoll( ) also sums this data from all of the CDNs and stores it in the SMmon internal structure that is written to disk and available for viewing.

The CP-AC recognizes the IPKILLCALL message from TI-IP and the new KCKILLCALL message from the OMP. These messages will only be recognized on the ACDN. Each of these messages will result in either the ACDN acting on the message itself or the ACDN formatting and sending a MGKILLCALL message to the CDN handling the call. The MGKILLCALL message is expanded such that the KCK-ILLCALL message is appended to it. Additionally a flag is added to MGKILLCALL to indicate whether this is an enhanced MGKILLCALL.

For IPKILLCALL messages from TI-IP, the ACDN is always responsible for sending the acknowledgment to TI-IP. If the digits look OK then IP_PF will be returned; otherwise, IP_NG will be returned. The ACDN will then examine CCF DB for the given DN, the command to see if it is Alert Only, and the GCSL to see if a call is active for the DN. If the command is not Alert Only and a call is active for a valid DN then the ACDN formats the KCKILLCALL portion of the MGKILLCALL message and sends it to the CDN handling the call. Otherwise, the ACDN formats and sends the OPKILLCALL message to TI-OP indicating the command was Alert Only or why the call cannot be torn down.

For KCKILLCALL messages from the OMP, the ACDN is responsible for checking to see if the result is already filled in. If it is then the OPKILLCALL message is formatted and sent to TI-OP with the result indicated by the OMP. Otherwise processing continues as in the IPKILLCALL case with CCF DB, the command, and the GCSL being examined and sending either an OPKILLCALL message to TI-OP or a MGKILLCALL to the CDN handling the call. If an OPKILLCALL is sent to TI-OP then the ACDN is responsible for sending the result to the OMP. Otherwise the CDN handling the MGKILLCALL message will send the tear down results to the OMP.

Additionally, for both IPKILLCALL and KCKILLCALL messages, the ACDN is also responsible for examining the Last Seen Pointer in CCF DB to determine if the mobile is roaming in another system. If the mobile is roaming the ACDN formats and sends a minimal QUALDIR to the visited system with originations and terminations denied. The ACDN is also responsible for sending the OPKILL-CALL message to TI-OP. If the request was initiated by the OMP, the ACDN also sends a KCKILLCALL response message back to the OMP.

The MGKILLCALL message processing will recognize if the MGKILLCALL message is an enhanced MGKILL-CALL message. If it is not an enhanced MGKILLCALL message no changes will be made to the way it is processed. For enhanced MGKILLCALL messages the processing follows the old MGKILLCALL processing with additional processing for determining if the call can be torn down and for sending a response to the OMP if the message came from the OMP (the request number is non-zero). The mcr→cpcr.cp_nrcall bit will be examined to determine if the call is non-restricted and cannot be torn down.

The EKCC feature of the present does however affect the type of AMA records generated when a call is killed. Specifically, when EKCC is used to kill a call and the command is Kill Call with AMA, a billable AMA record will be generated. When the command is Kill Call without AMA, an AMA Security Entry will be generated. If the command is Alert Only, EKCC does not kill the call. The call continues and generates whatever AMA record is required.

The OMP server 22 interfaces with the TCP/IP network 18 and with the vendor computer 12 via the interface defined by the protocol specification as described below. The server monitors for client requests, kill call results from the CDN, authorized system database update requests, and administrative timers to expire. Its primary task, of course, is to respond to client requests to tear down calls, and return the results of the kill call request to the client.

Preferably, when a client requests that a call be torn down, for security purposes a challenge (a random key) is sent from the server to the client. The client uses the challenge along with a shared secret password to create a signature, and then sends the kill call request to the server with the signature embedded in the request. The kill call request is forwarded to the ACDN/CDN for the actual tear down. Once the ACDN/CDN has completed its task, the kill call results are sent back to the OMP server, reformatted with the information defined in the protocol specification and returned to the client.

Tearing Down a Call

Figure 3:
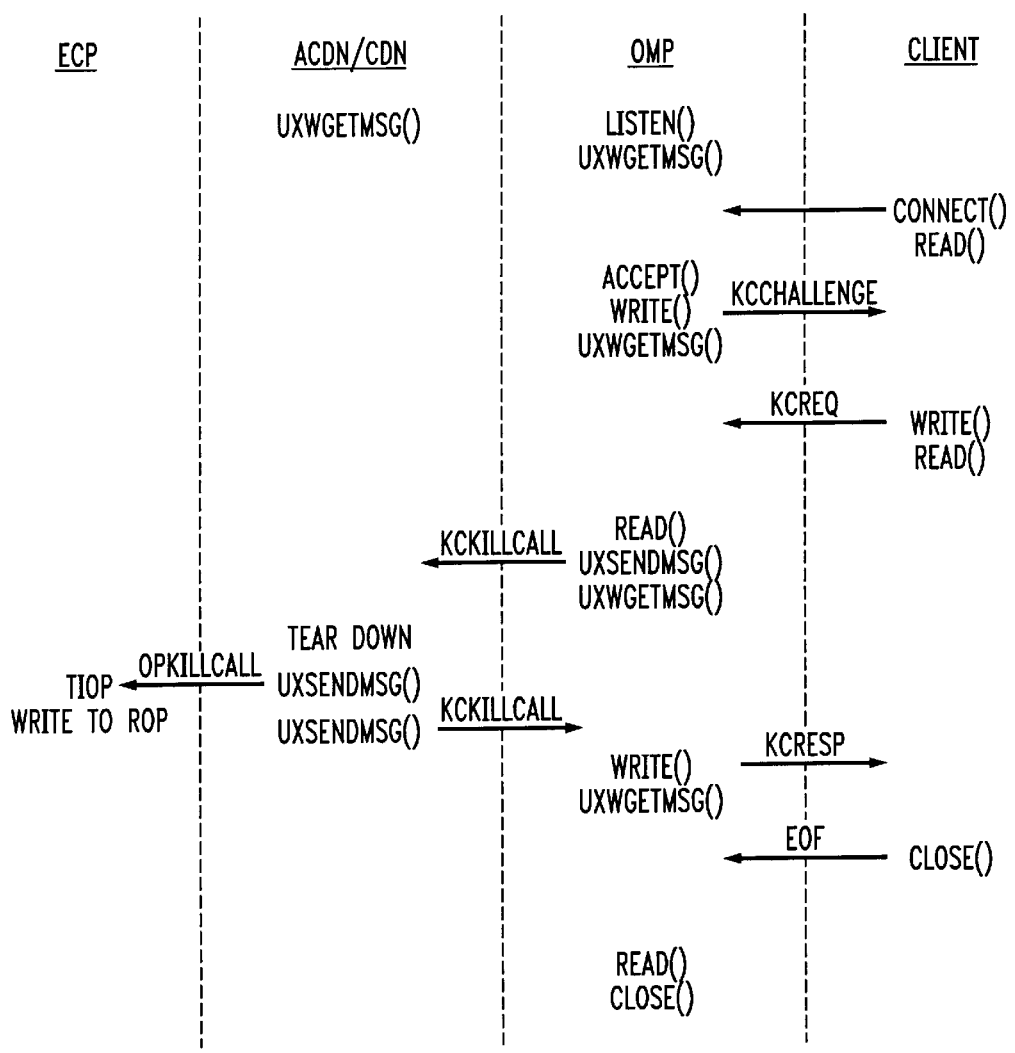
FIG. 3 is a illustration of the tear down message flow from the perspective of the kill-call server of FIG. 1.

FIG. 3 shows the message flow of a successful kill call request, described as follows:

1. The server opens a well known socket port for the Enhanced Kill Call Capability. This port is also referred to as the "connection socket". When input is received on the connection socket, the server will be notified by the receipt of a SIGPOLL. The server loops waiting for client requests (listen( )), among other things.
2. The client issues a connection request (connect( )) to the server. The server is notified of the client request via a SIGPOLL.
3. The server accepts (accept( )) the connection request and a new socket is created (referred to as a client socket). The file descriptor for the socket is massaged to generate a SIGPOLL when input is received on the server side. The server then validates the connection request by obtaining the client's host name and IP address, and looking it up in its table to verify that the client is authorized to use this feature
4. If the client is authorized, a random key (challenge) will be generated by the server and sent to the client. The server then uses the plain text password for that system as found in the flat file database along with the challenge to generate a signature for authentication. The signature is stored in a connection table (indexed by the client socket fd).
5. The client reads the challenge, generates the signature (the client knows the password that is stored in the server's database), and formats a kill call request message with the signature, dn, client's request number, and the command requested. The kill call request message is then sent to the server.
6. The server is notified, by receipt of a SIGPOLL, that it has data to read from the client. After reading the kill call request, the server compares the signature from the message with the signature stored in the connection table. The server also verifies that the client has the authority to use the requested command.
7. A killcall message is formatted and sent to the ACDN for further processing. Note: If the authority checks fail, the kill call message will indicate the reason for the failure but will still be sent to the ACDN so that the request can be displayed on the ROP.
8. The server then goes to sleep until it is interrupted, presumably by either a SIGPOLL indicating that a new client request is pending, a message indicating that it's time for a socket audit, a system table update message, or a message indicating that the killcall request has been processed by the ACDN/CDN.
9. The killcall message returned by the ACDN/CDN is used to create a killcall response message that is sent to the client.
10. The server then goes back to sleep waiting for another interruption. The client could leave the socket open and periodically send killcall requests, or it could close the socket and reopen it for a subsequent killcall request.
11. When the client closes the socket, the server is interrupted via a SIGPOLL. The server then tries to read from the client socket and is notified (by the return code from read( )) that the client has closed its end of the socket. The server closes the socket on its end and the socket tear down is complete.

Figure 4:
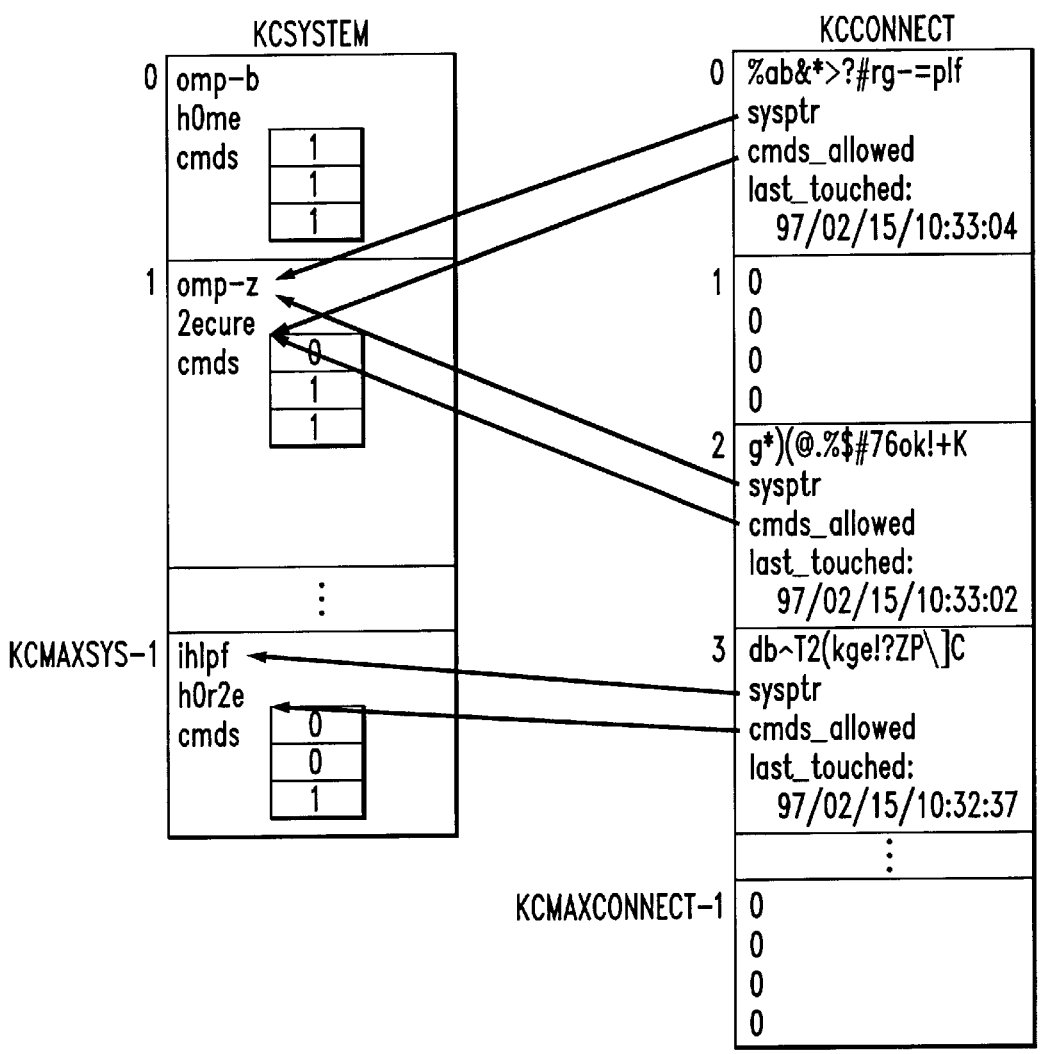
FIG. 4 is an illustration of the administrative tables of the kill-call server of FIG. 1.

The server maintains two global tables as shown in FIG. 4: an authorized system table (KCsystem), and a client connection table (KCconnect). An entry is made in the KCsystem table for each system found in the KC system file. A free pointer is maintained to designate the next free slot in the KCsystem table. This table can be viewed as a fixed table (updates are allowed, but will likely be infrequent).

The connection table is indexed by the socket file descriptor for a client connection. The KCconnect table maintains information for each client connection. The table itself has a fixed length, which is the maximum number of client connections allowed. The table contents, however, are dynamic.

Server Administrative Functions

A socket connection audit is run every ten minutes by the OMP server in case clients are terminated abnormally. The KC server's connection table is indexed by a socket file descriptor. When a client connection is established, the server timestamps the connection table entry for that socket. The server updates the timestamp for any subsequent client requests on that socket. When the client closes the socket, the timestamp entry is cleared, indicating to the server that the socket is not in use.

During normal activity, a client connection will be closed by the server if it has been idle for more than 60 minutes. If more than 80% of the maximum available client connections are in use, the server goes into an overflow state. When the server is in overflow, the maximum idle time allowed drops down to 20 seconds. The audit is then run every minute. The overflow state is gone when the server drops back down to 60% utilization for 5 minutes.

CDN Kill Call Process

This process will recognize both the regular and the enhanced MGKILLCALL messages. The regular MGKILLCALL message will have killmsg_ptr→ekcc set to FALSE and the enhanced MGKILLCALL message will have killmsg_ptr→ekcc set to TRUE.

When killmsg_ptr→ekcc is FALSE the regular operation will be unaffected.

When killmsg_ptr→ekcc is TRUE changes will be made so the following occur:

- If a pointer to a valid MCR is found then the mcr→cpcr.cp_nrcall will be examined to see if this is a non-restricted call. If it is then no attempt will be made to kill the call, the OPKILLCALL message will be sent to TI-OP, and if the request number is not zero (KCKILLCALL from OMP) a reply will be sent to the OMP.

The calls to CPfmprpt( ) for Fraudulent Mobile Print will be skipped.

The mcr→cp_ekcc_bama and mcr→cp$_{13}$ ekcc_sama bits will be initialized to FALSE.

The mcr→cp_ekcc_bama bit will be set to TRUE before the call to CPregaud(mcr) if the EKCC command is Alert Only or KillCall with AMA.

The mcr→cp_ekcc_sama bit will be set to TRUE before the call to CPregaud(mcr) if the EKCC command is KillCall without AMA.

Note that EKCC will still set the mcr→audkill flag to TRUE so the call is killed without an Audit Data Dump.

The current code for pegging SM counts of calls killed via the old KILLCALL messages will be skipped.

If the value returned from CPregaud(mcr) is CPSUC-CESS then the SM ECP SHORT count for calls torn down by EKCC will be pegged.

An OPKILLCALL message will be formatted and sent to TI-OP based on the return value from CPregaud( ) indicating success or failure.

The current code for sending TCRESPONSE messages will be skipped.

If the EKCC request number is not zero (KCKILLCALL from OMP) a reply will be sent to the OMP indicating if the call was torn down or not.

Call Processing Audit

This audit will be changed so that if the mcr→cp_ekcc_bama bit is TRUE the generation of the Billable AMA record will occur regardless of the FAIVAMA feature value. Additionally, if the mcr→cp_ekcc_sama bit is TRUE, or mcr→cp_ekcc_sama is FALSE and the mcr→cp_ekcc_bama bit is FALSE, then the generation of the AMA Security entry will occur. The case where both bits are FALSE serves to preserve the existing functionality.

Main ACDN Kill Call Functions

One function will be created to process the KCKILL-CALL message that comes from the OMP process. It will do some preliminary checking of the KCKILLCALL message and either send the KCKILLCALL reply directly to the OMP or forward the CPKILLMSG to the CDN that is handling the call for the DN in the message. The CDN receiving the CPKILLMSG will then be responsible for replying to the OMP.

```
ACompkc(msgptr)
KCKILLCALL *msgptr;
{
    if (range check of digits and command fails)
        format and send results to OMP
        format and send OPKILLCALL to TI-OP
        return
```
-continued
```
    if (command is Alert Only)
        format and send results to OMP
        format and send OPKILLCALL to TI-OP
        return
    if (result was filled in by KC-OMP)
        format and send results to OMP
        format and send OPKILLCALL to TI-OP
        return
    if (read of subscriber data fails)
        format and send results to OMP
        format and send OPKILLCALL to TI-OP
        return
    if (subscriber is roaming)
        ACfqumaj()
        format and send results to OMP
        format and send OPKILLCALL to TI-OP
        return
    if (GCgetcdn() returns No call up for the DN)
        format and send results to OMP
        format and send OPKILLCALL to TI-OP
        return
    set enhanced to TRUE in CPKILLMSG
    format CPKILLMSG appending KCKILLCALL
    use ACsendcp(killmsg, cdn) to send CPKILLMSG to CDN
    handling call
}
```

Another function will process the IPKILLCALL message that comes from the TI-IP process and send the result back to TI-IP. This function will do some preliminary checking of the command and reply back to the TI-IP process with either an ACK (Printout Follows) or a NACK (No Good).

```
ACuxkc(msgptr)
CPIPMSG *msgptr;
{
    if (range check of digits and command fails)
        IPACK(msgptr,IP_INTERR)
        return
    if (command is Alert Only)
        IPACK(msgptr,IP_PF)
        format and send OPKILLCALL to TI-OP
        return
    if (read of subscriber data fails)
        IPACKQUAL(mptr, IP_NG, CPIPFAIL_ACK,
        IPNULLDATA)
        return
    if (subscriber is roaming)
        ACfqumaj()
        IPACK(msgptr,IP_PF)
        format and send OPKILLCALL to TI-OP
        return
    if (GCgetcdn() returns No call up for the DN)
        IPACKQUAL(&ackmsg, IP_NG, CPIPCT_IDLDN,
        IPNULLDATA)
        return
    IPACK(msgptr,IP_PF)
    format CPKILLMSG
    set enhanced to TRUE in CPKILLMSG
    use ACsendcp(killmsg, cdn) to send CPKILLMSG to CDN
    handling call
}
```

Global Data

The global kill call data includes global variables, as well as the definition of the authorized system table (KCsystem) and the client connection table (KCconnect). The authorized system table includes one entry for each system as defined in the authorize system database file (/omp-data/user/etc/kcsys). The table is used for system validation when a client connects to the server. The client connection table includes an entry for each client connection. This table stores the client's signature and a pointer to the list of valid commands for the system as found in the system table.

Kill Call Server Initialization

This function contains the steps needed for initialization of the KC server process on the OMP.

KCsig_handler( ): signal handling function

KCinit( ): The following initialization steps are performed by this function:

KCtblinit( ):
⇒ Initialize the KC system table from the authorized system database file—/omp-data/user/etc/kcsys
⇒ Initialize the system connect table Set up signal handling for SlGPOLL Create a socket for client connections Set up the connection socket so that the server gets a SIGPOLL on input.

listen( ) for client requests

Kill Call Functions

The functions include the main processing loop for the server. The main processing loop is as follows:

Loops forever
⇒ KCwork_to_do( ): Does all the work queued for the server
⇒ KCwait_for_work( ): Sleeps waiting for more work.

The following functions are needed for servicing a client request (for client/server communication only):

KCclient_req( ): processes client requests.
⇒ Loop until there are no more client requests.
⇒ If the client request came from the connection socket, call KCconnect_client( ).
⇒ If the client request came from any socket other than the connection socket, call KCapi( );

KCconnect_client( ):
⇒ Accept the client's request.
⇒ Set the new socket (client socket) up so that the server receives a SIGPOLL when input is received.
⇒ Add the socket to the list of sockets to scan on input notification.
⇒ Validate the client's hostname from the global system table.
⇒ Create a challenge (random key) for this client.
⇒ Update the connection table with the signature, and pointers to the system id and commands allowed for this system as found in the authorized system table. The connection table is indexed by the client socket descriptor.
⇒ Write the CHALLENGE message to the client.

KCapi( ): non-connection oriented client request
⇒ Read from the client socket.
⇒ If client closed, close socket on server side and reset the signal generation for that file descriptor. Also clear the readmask bit for that file descriptor so that the server does not check that file descriptor when it gets a SIGPOLL indicating that one of its file descriptors has an outstanding input request.
⇒ If a kill call request is received, call KCkillcall( )

KCkillcall( )
⇒ Copy the appropriate information from the client request into a KCKILLCALL structure (converting to host format when necessary).
⇒ Populate the KCKILLCALL timestamp field with the local time from the OMP.
⇒ KCvalidate( ): Validate the request.
⇒ Send the KCKILLCALL request to the ACDN. The message will be sent to the ACDN even if the validation fails. The ACDN will log all kill call attempts.

KCvalidate( ): validate the system and request.
⇒ Validate the signature using the signature stored in the KCconnect table.
⇒ Ensure that the client has permission to use the command requested.

The following functions are needed for processing inter-process communications (IPC) messages returned when waiting for messages:

KCuxmsg( ): general IPC message processing function for the server. Call KCresp( ) if a KCMKILLCALL message type is received. Call KCupdate( ) if an update message is received.

KCresp( ): Formats a KCKILLRESP message and writes it to the client
⇒ Copies the DN, and result from the KCKILLCALL message to the KCKILLRESP structure.
⇒ Copies the request number and mscid from the KCKILLCALL structure to the KCKILLRESP structure, converting to network format.
⇒ Sets the type and length of the message in the header.
⇒ Writes the KCKILLRESP structure to the client.

KCupdate( ): Updates the KC system table for the hostname defined in the message.

For additions and modifications, the KC system file will be read to get the required parameters.

The following functions are also included:

KCwork_to_do( ): Checks to see if there is any work pending for the server (or if it's safe to go back to sleep). This function does not check to see if an IPC message has been delivered. The function that waits for IPC messages will return if there is. Work is defined as time for a socket audit or a pending SIGPOLL indicating a client request is outstanding.

KCdo_work( ):
⇒ If a client request is outstanding (received a SIGPOLL), call KCclient_req( );
⇒ If it's time for an audit, call KCsock_audit( ) which does the following;
Clears the audit timer flag
Loops through the connection table looking for entries with non 0 timestamps. Ensures that the maximum idle time allowed has not expired. If it has, call KCclose_sock( ) which will close the socket, clear the SIGPOLL interruption from input on the socket, and delete the socket from the readmask. Next, clear the connection table entry for the closed socket.
Reset the audit timer.

KCwait_for_work( ):
⇒ Wait for IPC messages;
If an IPC message is received, call Kcuxmsg( ).

KC System File

This is the authorized system database for the EKCC feature. The file is delivered as follows:

This is the permissions file for the Enhanced Kill Call Capability.
Permission is granted to a system on a per host name basis.
Each system is assigned a list of valid commands.
See the Enhanced Kill Call documentation for further details.

An entry must be made for each system with the following \# keywords (in order) "SYSTEM;", "PASSWD;", and "CMDLIST;".
\# Each keyword must start on a new line.
\#
\# Example entry:
\#
\# SYSTEM;ny20
\# PASSWD;n0tt0day
\# CMDLIST;{1 2 3}
\#

Random Key Generator

These functions are used for generating a random key that is used for generating a client signature.

Signature Function

This function:

concatenates the random key and the shared secret password to create the input to the RSA Data Security, Inc. MD5 Message-Digest Algorithm.

calls the RSA Data Security, Inc. MD5 Message Digest Algorithm (which is a cryptographic hashing functions ) to create a signature.

This function will be used on both the client and server side for creating a signature, and will be provided in pseudo code to external customers.

ac/kc/omp/md5.c

This file contains the RSA Data Security, Inc. MD5 Message Digest Algorithm used for creating a cryptographic hash (signature). This file is available to the public and will also be used by the client.

Other Considerations

External Interfaces

Introduction

To tear down a call from a TCP/IP network client using this capability, the invalid call detection client application uses the protocol specification defined below.

Before using the EKCC feature, the OMP system administrator must:

1. Configure a killcall TCP/IP port for client/server communication
2. Administer the /omp-data/user/etc/kcsys file on the OMP to include a list of authorized client systems.

Once the administrative tasks are complete, a client will connect to the OMP server using a TCP/IP socket connection. All sessions start with an authentication step to ensure that only authorized clients are able to kill calls.

A secret password is shared between the client and the server. When a valid client connects to the server, a random key is sent to the client in a challenge message. The client uses the random key along with the shared secret password to generate a signature.

A cryptographic hashing function, the RSA Data Security, Inc. MD5 Message-Digest Algorithm, is used to create a signature from the random key and the shared secret password. With a cryptographic hashing function, the input is hashed to a small, fixed-length value using a cryptographic algorithm that is very difficult to invert. The input is the random key and the shared secret password. The output is a value that can be used as an integrity check. A signature is relatively easy to calculate, but difficult to forge.

All killcall requests using the current session will include the generated signature.

Once the authentication step has completed, the client formats and sends a killcall request message to the OMP server. After the killcall request has been processed, results will be sent back to the client in a killcall response message.

The client will likely keep the current server connection open for subsequent killcall requests. Once the socket connection is torn down, all subsequent killcall requests must repeat the connection and authentication steps.

All connections that have been idle for more than 60 minutes will be torn down by the server.

Transport Protocol

The Enhanced Kill Call Capability uses the TCP/IP transport protocol.

Authorized System Database

A system file (kcsys) is created on the OMP (by the OMP administrator) with an entry for each system that has permission to use the Enhanced Kill Call Capability. The file has the following format:

SYSTEM:hostname_or_IPaddress
PASSWD:password
CMDLIST:{[1–3]}
A sample file follows:
SYSTEM:ny10
PASSWD:jack24jill
CMDLIST: {1 2 3}
\# Comment lines are ignored
SYSTEM:cal20
PASSWD:10sange10s
\# Spaces anywhere after the ';' are also ignored
CMDLIST:{3}
SYSTEM:135.1.13.21
PASSWD:id0ntkn0w
CMDLIST: {1 2 3}

The keywords "SYSTEM:", "PASSWD:", and "CMDLIST:" must be included for each valid system. The SYSTEM id is either the system's host name on the network or an IP address. The system id can be up to 256 characters. The PASSWD is a plain text character string up to 16 characters. The command list includes a bracket "{ }" list of kill call commands (described below) allowed for that system. Each of these keywords must begin on a new line.

Valid Commands

Valid commands are:

| VALID COMMANDS | |
| --- | --- |
| Command | Description |
| 1 | Kill Call Without an AMA |
| 2 | Kill Call With an AMA |
| 3 | Alert Only |

If a call is torn down using the command "Kill Call without an AMA", an AMA Security Entry only will be created at the home system.

If a call is killed using the EKCC command "Kill Call with AMA", a Billable AMA entry will be created at the home system.

If a call is killed using the EKCC command "Kill Call Alert Only", this feature will not affect the AMA entry.

If a call is killed in a visited system using EKCC, the AMA records currently generated by the call tear Down (KILLCALL) optional feature will be created at the visited system.

Valid Results
Valid Kill call results are:

| Valid Kill Call Result Values | |
|---|---|
| Value | Description |
| 1 | Call Torn Down (success) |
| 2 | DN (Mobile ID) Not found |
| 3 | Call Cannot be Killed |
| 4 | Password not valid |
| 5 | Restricted Call-not killed |
| 6 | Tear Down Requested (on a visited system) |
| 7 | Request printed, no tear down |
| 8 | Invalid command |

A kill call result of 9 is displayed at the ROP if an unauthorized system connects to the server. The connection will be closed by the server and no messages will be sent to the client.

Client/Server Message Format

All message types exchanged between the OMP and the client are in the following format:

| | | Client Server Message Format | | |
|---|---|---|---|---|
| FIELD | Field Size | Description | Variable Type | Format |
| MTYPE | 4 bytes | message type | unsigned long | network byte order |
| LEN | 4 bytes | message body length | unsigned long | network byte order |
| TEXT | <=2040 | message body | ASCII Text | N/A |

Network byte order means that the most significant byte is first. Depending on your processor architecture, this may differ from your host byte order.

Message Types

The following message types can be exchanged between the OMP and the client:

| | Client/Server Message Types | | |
|---|---|---|---|
| MTYPE | Description | OMP-> Client | Client->OMP |
| 1 | Request to tear down a call | | X |
| 2 | Tear down result/response | X | |
| 3 | challenge for creating a client signature | X | |

Protocol

Figure 5:
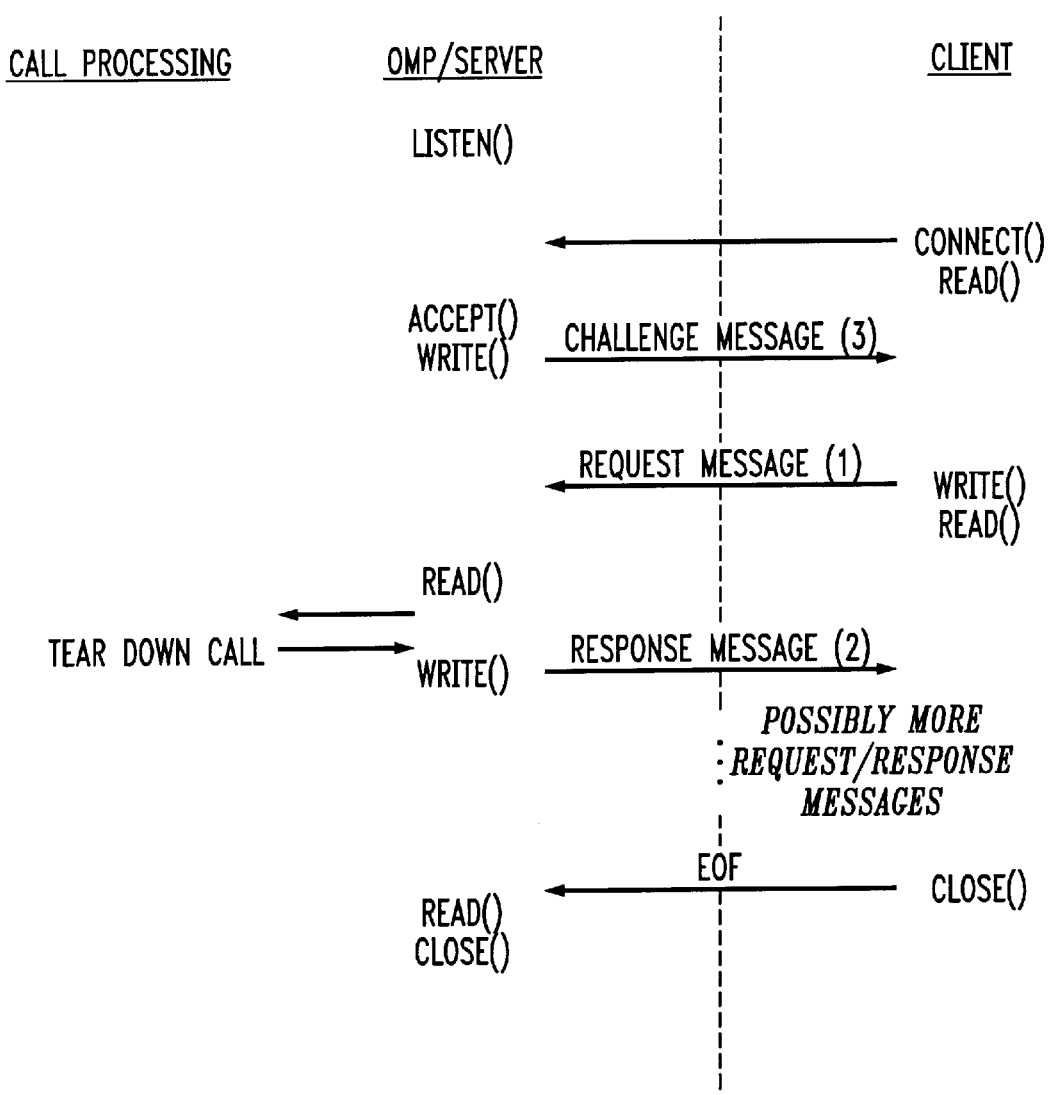
FIG. 5 is a diagram illustrating the message flow between the client, or vendor computer, of FIG. 1 with the kill-call server for a valid authorized system to tear down a call.

The diagram of FIG. 5 depicts the message flow between the client and server for a valid authorized system to tear down a call. All sessions start with an authentication step to ensure that only authorized clients are able to kill calls. The steps are as follows:
1) A client connects to a well known port on the OMP (server system), as specified in the/etc/services (or equivalent) file.
2) Once an authorized client has connected to the server, the server sends a message with the random key (challenge) to the client with the following format. An unauthorized system will have been immediately disconnected and will not receive the challenge message.

| CHALLENGE Message Format | | | | |
|---|---|---|---|---|
| FIELD | SIZE | DESCRIPTION | VALUE | FORMAT |
| MTYPE | 4 bytes | Message Type | 3 | network byte order |
| LEN | 4 bytes | Length of rest of message | 8 | network byte order |
| RANDOM_KEY | 8 bytes | random key to be used with shared secret password to create a signature | <ASCII Text> | byte stream |

3) The client uses the challenge, along with the shared secret text password that is stored in the kcsys file on the OMP, to create a signature. The signature is created using the RSA Data Security, Inc. Message-Digest Algorithm described below. The shared secret password is up to 16 characters.

The MD5 functions can be obtained by obtaining RFC1321 from ds.internic.net.

The function used to obtain the client signature should do the following:

Append the shared secret password to the random key obtained from the challenge message.

Call MD5Init( )

Call MD5Update( ) passing it an MD5_CTX pointer, the concatenated string and the length of the password+the length of the challenge. NOTE: these strings are NOT null terminated.

Call MD5Final( ) passing it a 16 character digest and the pointer to the MD5_CTX used in the call above.

Use the 16 byte digest as the signature.
Sample code follows:

```
#define PASSWDSZ (16)
UCHAR    challenge[8];
UCHAR    passwd[PASSWDSZ + 1];   /* Add 1 for NULL termination of a
16
                                   ** byte password */
UCHAR    concatstr[PASSWDSZ + sizeof(challenge)];
UCHAR    digest[16];             /* This is the signature */
long    passwd_len;
/*
** Get the actual password length and store it in passwd_len.
** Ensure that the password is NULL terminated for strlen(). The password may
** already be NULL terminated if it is shorter than 16 bytes.
** The password length can be shorter than 16, but it can never be more.
*/
passwd[PASSWDSZ]= '\0';
passwd_len = strlen(passwd);
/*
** Create a string that is the concatenation of the challenge and the password.
*/ memcpy(concatstr, challenge, sizeof(challenge));
memcpy(&concatstr[sizeof(challenge)], passwd, passwd_len);
MD5Init(&context);
MD5Update(&context, concatstr, (passwd_len+sizeof(challenge));
MD5Final(digest, &context);
```

4) The client then sends the server a request to kill a call using the following message format:

Kill Call Request Message

| FIELD | SIZE | DESCRIPTION | VALUE | FORMAT |
|---|---|---|---|---|
| MTYPE | 4 bytes | Message Type | 1 | network byte order |
| LEN | 4 bytes | Length of rest of message | 32 | network byte order |
| REQUEST_NO | 4 bytes | Client request number | | network byte order |
| SIGNATURE | 16 bytes | signature generated by using the cryptographic hashing function | | byte stream |
| DN | 10 bytes | Mobile ID | | ASCII byte stream |
| COMMAND | 1 byte | Command requested | | byte |
| PAD | 1 byte | structure padding | | N/A |

The REQUEST_NO is a value that is only used by the server for logging purposes. It is a value that is set by the client and can be used by the client application in any manner chosen.

5) The results of the kill call request will be sent from the OMP to the client with the following message format:

Kill Call Result Message

| FIELD | SIZE | DESCRIPTION | VALUE | FORMAT |
|---|---|---|---|---|
| MTYPE | 4 bytes | Message Type | 2 | network byte order |
| LEN | 4 bytes | Length of rest of message | 36 | network byte order |
| REQUEST_NO | 4 bytes | Client request number | | network byte order |
| MSCID | 4 bytes | MSCID | | network byte order |
| DN | 10 bytes | Mobile ID | | ASCII byte stream |
| TIMESTAMP | 14 byte | Time server received the request | | ASCII byte stream |
| RESULT | 1 byte | Results of the killcall request | | byte |
| PAD | 3 bytes | structure padding | | N/A |

The TIMESTAMP contains the time that the kill call request was received by the server. It has the following format:
MM:DD:hh:mm:ss
where
MM is the month
DD is the day
hh is the hour
mm is the minute
ss is the second 6) The client can then either make another kill call request, or close the socket.

The socket will remain open on the server side until either the client side closes or the server does not detect activity on the socket for more than 60 minutes. If the server becomes overloaded with connections, a socket connection will be torn down if it has been idle for more than 20 seconds.

GLOSSARY

| | |
|---|---|
| AC | Administrative Control Process |
| ACDN | Administrative Call Processing Database Node |
| CP | Call Processing |
| EKCC | Enhanced Kill Call Capability |
| IMOM | Input Manual Output Manual |
| IP | Input Process |
| KC | Kill Call (Call Tear Down) |
| KILLCALL | Call Tear Down (KILLCALL) |
| OMP | Operations and Maintenance Platform |
| OP | Output Process |
| TCP/IP | Transmission Control Protocol/Internet Protocol TCP/IP Internet Protocol |
| TI | Technician's Interface |

While a specific embodiment has been disclosed for purposes of illustrating the invention it should be appreciated that the invention is not limited to those details but rather is defined by the appended claims.

What is claimed is:

1. A method of terminating an invalid mobile telephone call being serviced by a mobile service center, comprising the steps of:

determining at a mobile telephone service vendor computer linked with the mobile service center that an invalid call originating in a local service area of the vendor is in process;

generating from the vendor computer a kill-call command in response to determining that the invalid call is in process;

responding to the kill-call command at a kill-call server linked with the mobile service center and the vendor computer to transmit a call tear-down request message to the mobile service center;

wherein, the step of responding includes the steps of verifying authorization of the vendor computer associated with the kill-call command and, in response to verification of authorization of the vendor computer associated with the kill-call command, transmitting the call tear-down request message to the mobile service center; and tearing down the invalid call at the mobile service center in response to the receipt of the call-tear down request message.

2. The method of claim 1 in which the step of determining includes the step of monitoring calls with respect to matching associated radio frequency patterns of authorized mobile telephones to determine whether the calls are invalid.

3. The method of claim 1 in which the step of determining includes the step of monitoring remaining credit for calling charges associated with metered calls to determine whether the metered calls are invalid.

4. The method of claim 1 in which the step of generating is performed automatically in response to determination of an invalid call.

5. The method of claim 1 in which the step of determining includes the step of indicating at the vendor computer that a call is an invalid call and in which the step of generating is performed manually in response to the indication.

6. The method of claim 1 in which the step of responding includes the step of ascertaining that the call that is subject to the tear-down request message is active.

7. The method of claim 1 including the step of generating a report at the kill-call server related to results of the kill-call command.

8. The method of claim 1 including the step of interfacing the kill-call command from the vendor computer to the kill-call server through a transmission control protocol/internet protocol interface.

9. The method of claim 8 including the step of interfacing the call tear-down request message through a data link interface.

10. The method of claim 8 including the step of interfacing the kill-call command as a TI command through a T1 interface with the kill-call server.

11. The method of claim 1 including the step of interfacing the call tear-down request message through a data link interface.

12. The method of claim 1 in which the step of generating a kill-call command includes the step of indicating with the kill-call command whether a billable automatic message accounting entry should be made in association with the invalid call.

13. The method of claim 1 in which the step of generating a kill-call command includes the step of indicating with the kill-call command whether a security automatic message accounting entry should be made in association with the call.

14. The method of claim 1 in which the step of generating a kill-call command includes the step of indicating with the kill-call command whether information concerning the invalid call should be produced in lieu of tearing down the invalid call.

15. The method of claim 1 including the step of counting the number of invalid calls torn down in response to kill-call commands during a preselected time period.

16. The method of claim 1 including the step of generating an identification of the vendor with the kill-call command.

17. The method of claim 1 including the step of generating a multidigit directory number of the mobile telephone of the call that is subject of the kill-call command.

18. A system for terminating an invalid mobile telephone call being serviced by a mobile service center, comprising:

a vendor computer linked with the mobile service center and having means for determining that an invalid call originating in a local service area of the vendor is in process;

means responsive to invalid call determining means detecting an invalid call for generating from the vendor computer a kill-call command;

a kill-call server linked with the mobile service center and the vendor computer to transmit a call tear-down request message to the mobile service center in response to the kill-call command, wherein said kill-call server verifies authorization of the vendor computer associated with the kill-call command and, in response to verification of authorization of the vendor computer associated with the kill-call command, transmits the call tear-down request message to the mobile service center; and means at the mobile service center for tearing down the invalid call in response to the receipt of the call-tear down request message.

19. A system of claim 18 including a monitor for monitoring calls to match associated radio frequency patterns of authorized mobile telephones to determine whether the calls are valid.

20. A system of claim 18 including a monitor for monitoring remaining credit for call changes associated with metered calls to determine whether the metered calls are valid.

21. A system of claim 18 wherein the means for generating includes means for automatically generating the kill-call command.

22. The system of claim 18 including means for indicating at the vendor computer that a call is an invalid call and in which the means for generating is performed manually in response to the indication.

23. The system of claim 18 including, means for ascertaining whether the call that is subject of the tear-down request message is active.

* * * * *